March 26, 1963     A. T. KORNYLAK     3,082,861
CONVEYOR BELT
Filed Sept. 29, 1959     2 Sheets-Sheet 1
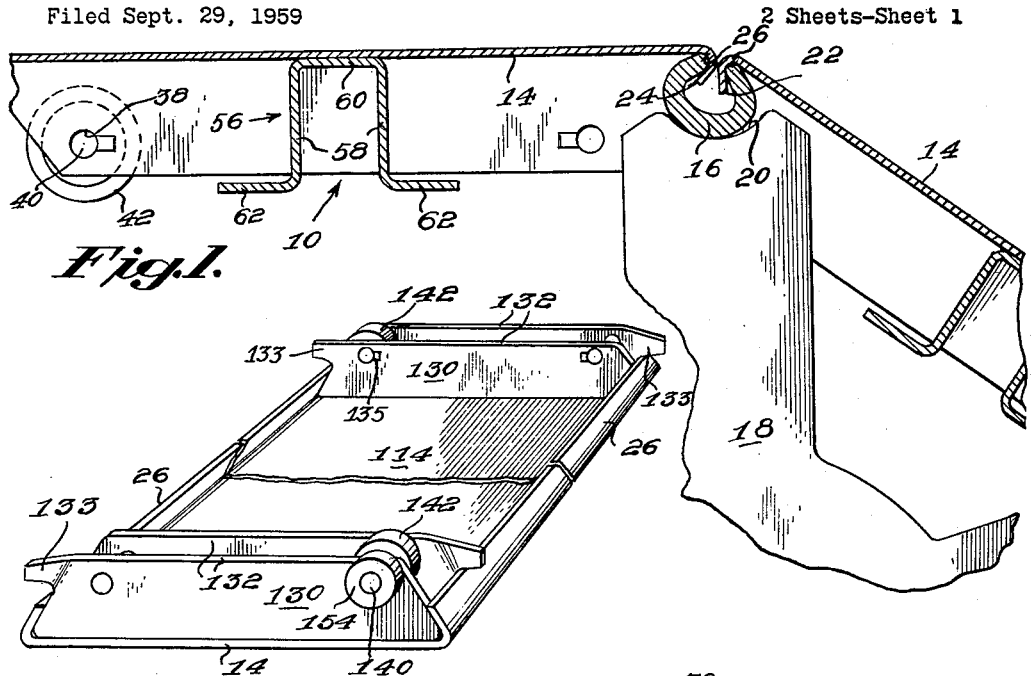
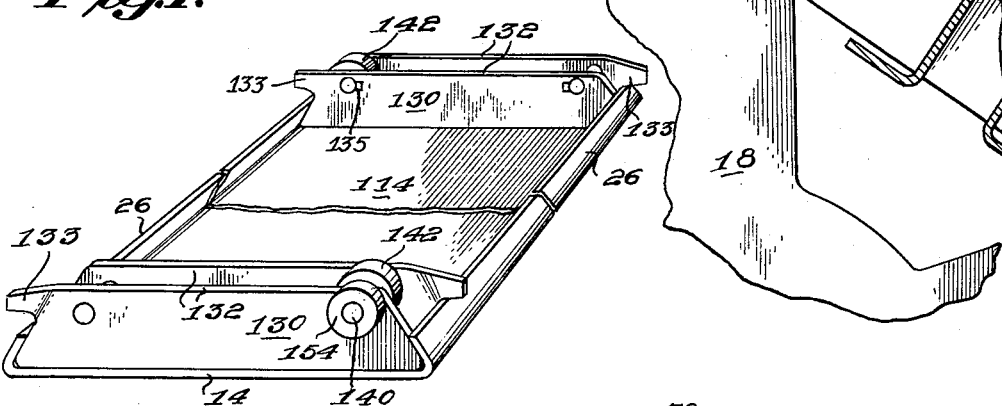
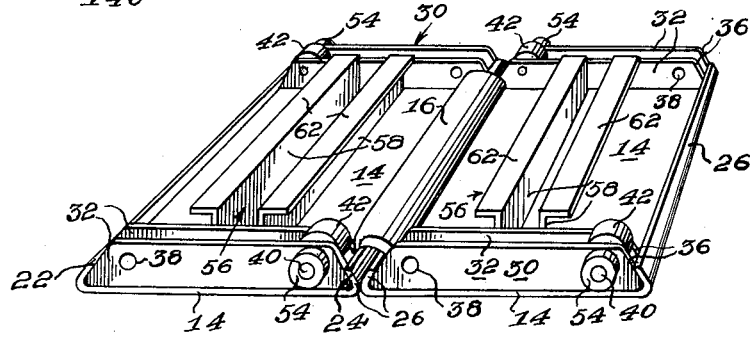
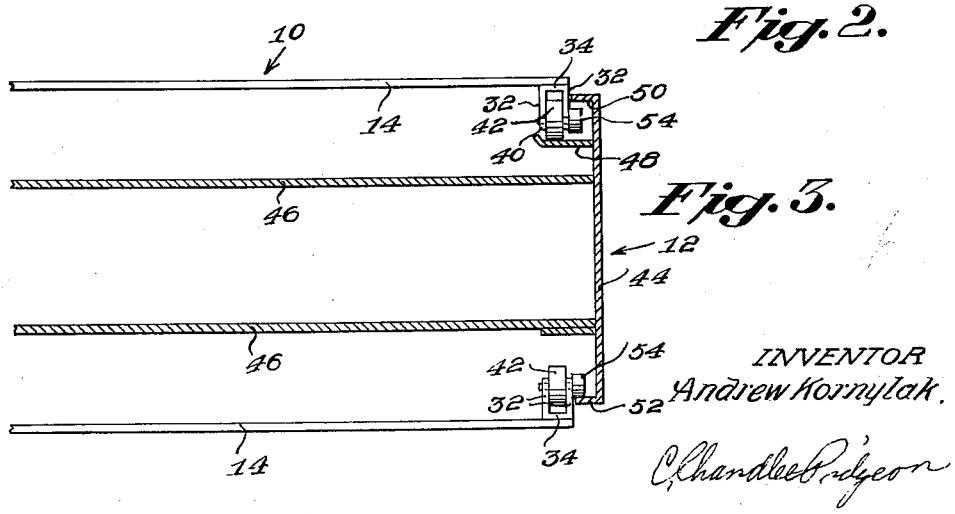
INVENTOR
Andrew Kornylak.
AGENT March 26, 1963     A. T. KORNYLAK     3,082,861
CONVEYOR BELT Filed Sept. 29, 1959     2 Sheets-Sheet 2

INVENTOR
Andrew Kornylak

AGENT

United States Patent Office 3,082,861
Patented Mar. 26, 1963

3,082,861
CONVEYOR BELT
Andrew T. Kornylak, Jersey City, N.J.
(400 Heaton St., Hamilton, N.J.)
Filed Sept. 29, 1959, Ser. No. 843,139
4 Claims. (Cl. 198—195)

This invention relates to a new improvement in a conveyor belt, and more particularly to a conveyor belt composed of a plurality of hingedly interconnected metal plates.

An object of this invention is the provision of a novel hinge connection for the metal plates facilitating the assembly and disassembly thereof.

An additional feature of this invention is the provision of a hinge adapted to allow the belt to take both inward and outward vertical curves.

A further object of this invention is the provision of an outboard roller on each plate to hold the plate in place on an inward curve, and to support the plates of the return flight of the belt.

Still another object is the provision of a hinge connection for the plates or slats of a conveyor such that the joints do not open on bends.

A still further object of this invention is the provision of a hinge connection whereby any conveyor may be assembled by hand.

An additional object of this invention is the provision of a conveyor belt of metal slats which is adapted to multilevel operation.

An additional object of this invention is the provision of a conveyor belt joint which is continuous across the width of the belt, providing a maximum bearing surface to resist wear.

A still further object of this invention is the provision of a conveyor belt of high tensile strength by virtue of a hinge joint wherein the tension is close to the surface of the belt and thus minimizes the bending movement and tendency to stretch.

These and other objects will become apparent from a consideration of the following specification taken with the accompanying drawings forming a part thereof.

In the drawings, wherein like parts are represented by like characters of reference:

FIG. 1 is a partial side view of a conveyor, partly in section;

FIG. 2 is an axonometric projection of a pair of conveyor plates showing the hinge;

FIG. 3 is a schematice cross sectional view at one end of the horizontal run of a conveyor;

FIG. 11 is an axonometric view of a slightly modified form of conveyor plate.

Figures 9, 10:
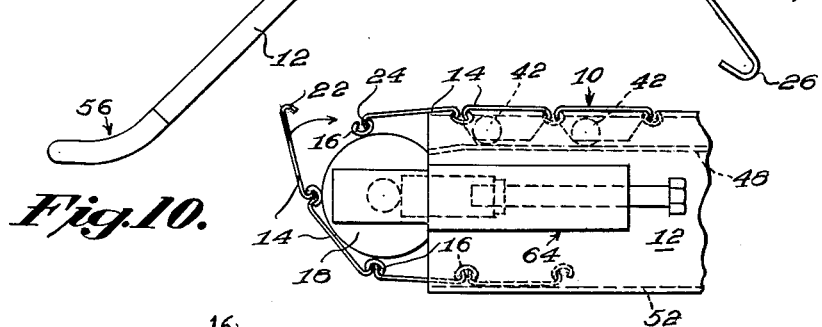
FIG. 9 is a partial side view of one end of a conveyor showing the assembly.
FIG. 10 is a diagrammatic view showing multilevel operation.

Referring now to FIGS. 1, 3 and 9, numeral 10 denotes my conveyor belt which is mounted on a suitable framework 12. The belt 10 comprises a number of plates or slats 14 connected together by means of hinge member 16. At either end of a run of the belt 10 there is a pair of sprockets 18, only one being shown. The sprockets 18 have suitably spaced notches 20 engageable with the hinge members 16, and one of the sprocket pairs is mounted on a driven shaft for producing translatory movement of the belt 10.

Each of the plates has a forward edge or lip 22 and rear edge or lip 24 turned downwardly and inwardly toward each other at an acute angle, as clearly shown in FIG. 1 to form channel-like hooks 26. Adjacent lips 22, 24 enter the space between the legs 28 of the hinge member 16 which is substantially C-shaped in cross section as shown in FIGS. 1, 7, 8 and 9. When the lips 22 and 24 are between the legs 28 of the hinge member 16, the adjacent plates 14 are flexibly connected so that the belt may pass about the sprockets and may negotiate upward or downward curves as in a multilevel arrangement, such as that shown in FIG. 10.

Figure 6:
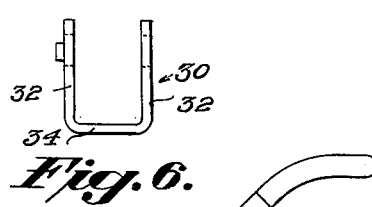
FIG. 6 is an end view of the roller bracket.

At each end of each plate or slat 14, I provide a roller bracket comprising channel member 30 having sides 32 and a back or bottom 34, as seen in FIG. 6. The ends of the channel member 30 are beveled as at 36 at the same angle as the lips 22 and 24 and the members 30 are fastened to the plates 14 with the beveled ends 36 under the hooks 26. Each channel member has, near either end, a pair of holes 38 to accommodate pins 40 for rotatably supporting rollers 42. In the present example the rollers 42 are arranged between the walls 32 and at diagonally opposite corners of the plate, providing normally but two rollers 42 for each plate.

It should be noted that the roller bracket prevents longitudinal movement of the C-shaped hinge member 16 along the flanges 24, 26.

As shown in FIG. 3, there will be a frame, such as 12, at either side of the conveyor, which will be supported at the desired height in any suitable manner. Each frame 12 may include a side plate 44, cross braces 46, and a trackway 48 on which the rollers 42 operate. The arrangement of these parts may vary according to the type of conveyor and the loads to be carried. There is an upper flange 50 and a lower flange 52 which with the plate 44 completely enclose the conveyor.

Adjacent each roller 42, outside the channel 30 there is an outboard roller 54 mounted on the pin 40 and which operates on the flange 52 for the return flight of the belt 10, and holds the plates 14 in line. When operating on an upward curve, such as the curve 56 in FIG. 10, the outboard roller 54 engages the flange 50 to hold the plates down.

Reenforcing means 56 comprising a channel member having sides 58, a bottom 60 and outwardly extending flanges 62 may be affixed to each plate or slat 14, as shown in FIGS. 1 and 2.

Figure 7:
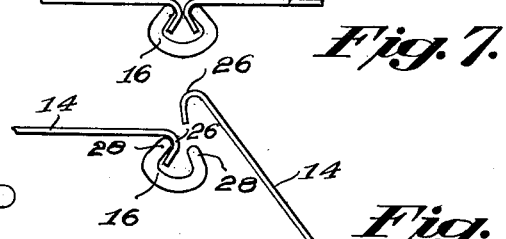
FIG. 7 is a fragmentary side view showing the hinge arrangement.
Figure 8:
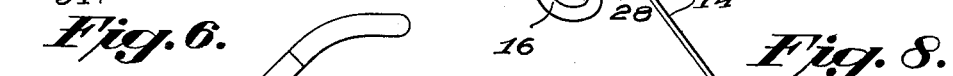
FIG. 8 is a fragmentary side view showing the manner of assembly.

In my prior Patent No. 2,746,595, issued May 22, 1956, I show a series of plates 1 hinged together in a manner similar to the hinging of the plates 14 in the present application. Herein I disclose a simpler construction since the Z-shaped plates 6 are found not to be needed in this construction. Furthermore, the hinge member 16 in the present invention can not be applied endwise as is the coupling of the aforementioned patent. However, the assembly is simple, as the plates 14 may be hooked together with the hinges 16 and laid out flat and the adjacent lips 22, 24 engaging in hinge member 16, and may be pulled or pushed over the flange 52 and one end may be brought over by engaging the rollers 42 on the trackway 48 and the end plates may be coupled as shown in FIGS. 7 and 8. For assembly, the idler sprocket 18 will be retracted by the belt tightener 64, of known construction. After assembly of the belt, the sprocket 18 will be adjusted by the mechanism 64 to provide the proper tension.

Figure 12:
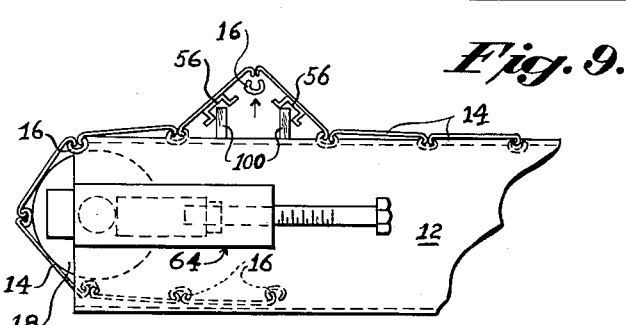
FIG. 12 is a diagrammatic showing of another assembly procedure, particularly for heavy belts.

For heavy belts, the assembly would be as described with the further step as shown in FIG. 12. A pair of adjacent slats are elevated by blocks of wood 100, after removing a section of the flange 50, and are brought together so that the adjacent lips 22, 24 may be inserted in a hinge member 16 that is brought up under them. Tightening the belt and withdrawing the blocks 100 completes the assembly.

Figure 4:
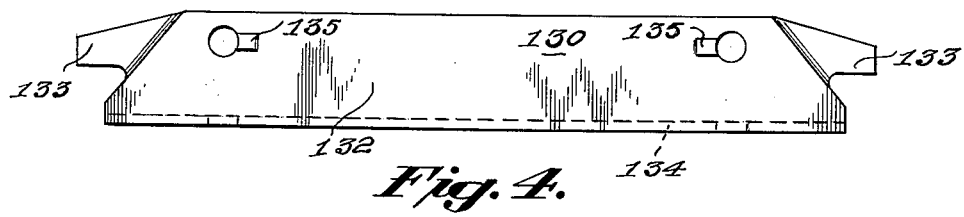
FIG. 4 is a side view of a roller bracket.
Figure 5:
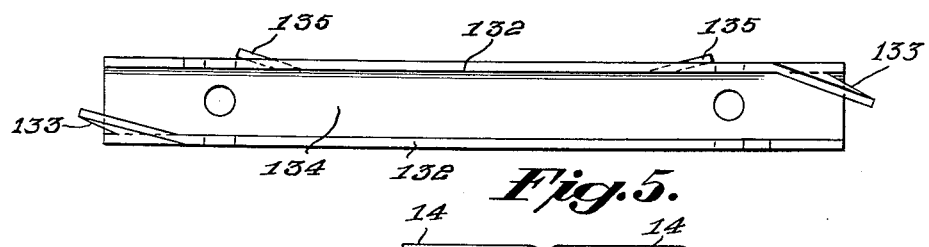
FIG. 5 is a bottom view of the roller bracket.

In FIGS. 4, 5 and 11, I show a somewhat modified form of slat or plate 114 having the roller brackets 130 of FIGS. 4, 5 and 11. Each bracket comprises side walls 132 and a back or bottom 134. One wall 132, of the bracket 130, has a longitudinally extending projection 133 at one end thereof and the other wall 132 has a similar projection 133 extending from the opposite end thereof, said projections being turned slightly inwardly to permit meshing with the oppositely facing projection on the bracket of the next adjacent slat. Thus projections 133, in the finally assembled belt project above the lips 22, 24 of the connected slats and prevent them from being accidentally disconnected. This construction is especially valuable when operating on an incline as in FIG. 10. Rollers 142 are mounted on pins 140 in openings 138 in the bracket 130. Lugs 135 pressed from the walls 132 are provided for locking the pins 140. On the pins 140 are also mounted outboard rollers 154.

In the specification and claims, the channel members 32, 132 are referred to as downwardly extending. The hinging flanges or lips 24, 26 or 22, 24 are referred to as downwardly turned. This reference is to the way these elements appear in the upper flight of the conveyor in FIGS. 1, 3, 9 and 12.

From the above description, it should appear that I have invented a simple, strong and effective conveyor belt, which may be easily assembled or disassembled and which has the conveyor elements enclosed to provide a minimum of hazard from contact therewith.

Having now described my invention in detail, I claim:

1. In a conveyor, a belt supporting frame including a longitudinally extending trackway and an upper flange partly overlying said trackway, a lower flange corresponding to said upper flange and spaced therefrom, a belt comprising an endless assembly of flat, rectangular slats having means for hingedly interconnecting them to form the belt, a channel shaped roller bracket adjacent each end of a slat, a first roller on each bracket adapted to run on the trackway to support the belt, a second roller not engageable with said trackway and adapted to run on the lower flange on the return flight, each said bracket comprising a channel member having sides and a bottom, said first roller being mounted between the sides, a pin supporting said first roller, said second roller being mounted on said pin outside said channel, each said channel having a projection extending longitudinally beyond one end of one channel side wall and the opposite end of the other channel side wall whereby said projections prevent unhinging of said slats.

2. The structure as defined in claim 1 wherein the means hingedly interconnecting the slats comprises a downwardly and inwardly directed flange at each edge of a slat and a C-shaped hinge member engaging over a pair of adjacent flanges.

3. The structure as defined in claim 1 wherein one projection is at one end of each outside channel side wall and the other projection is at the opposite end of each inside channel side wall, and wherein each projection is bent slightly inwardly toward the other channel wall.

4. The structure as defined in claim 1 wherein said flanges form a protective seal between the conveyor belt and the frame.

References Cited in the file of this patent

UNITED STATES PATENTS

| | | |
|---|---|---|
| 1,026,617 | Turnbull | May 14, 1912 |
| 1,045,523 | Cossey | Nov. 26, 1912 |
| 1,507,832 | Henry | Sept. 9, 1924 |
| 1,851,380 | Briggs | Mar. 29, 1932 |
| 2,741,358 | Bledsoe | Apr. 10, 1956 |
| 2,746,595 | Kornylak | May 22, 1956 |